United States Patent [19]
Liss

[11] 3,963,204
[45] June 15, 1976

[54] OUTLET BOXHOLDER

[76] Inventor: John F. Liss, Duncan, Nebr. 68634

[22] Filed: Aug. 29, 1974

[21] Appl. No.: 501,592

[52] U.S. Cl. .............................. 248/27 R; 174/58; 220/3.9; 248/DIG. 6
[51] Int. Cl.² .................... H02G 3/12; H02G 3/18; F16B 5/06
[58] Field of Search ................ 247/27, 205 R, 342, 247/343, DIG. 6; 174/57, 58; 220/3.7, 3.9, 3.92, 3.5, 3.6

[56] References Cited
UNITED STATES PATENTS

| | | | |
|---|---|---|---|
| 965,275 | 7/1910 | Birtwhistle | 220/3.9 |
| 1,439,438 | 12/1922 | Newton | 174/58 X |
| 1,847,169 | 3/1932 | Buchanan | 174/58 |
| 2,180,598 | 11/1939 | Mahan | 220/3.5 |
| 2,658,704 | 11/1953 | Smith | 220/3.6 X |
| 3,268,189 | 8/1966 | Ducharme | 248/27 |
| 3,392,943 | 7/1968 | Baxter | 248/27 |
| 3,448,884 | 6/1969 | Swanquist et al. | 220/3.9 |

Primary Examiner—J. Franklin Foss
Attorney, Agent, or Firm—Zarley, McKee, Thomte, & Voorhees

[57] ABSTRACT

An electrical outlet boxholder comprising a generally U-shaped strap member which is adapted to be inserted into an opening formed in a wall member. The strap member comprises a base portion and a pair of legs which depend therefrom. The outer ends of the legs terminate in laterally extending portions adapted to engage the outside surface of the wall member. A retainer is adjustably slidably mounted on each of the legs and has a first portion adapted to engage the inner surface of the wall member. Each of the retainers also has a second portion which is adapted to extend through the opening. The outlet box is inserted into the opening and is received between the retainers. The second portions of the retainers are deformable so that they may be bent inwardly around the outer edges of the outlet box. A modified form of the invention is disclosed for mounting an outlet or light fixture box in an opening formed in a ceiling. In the modified form of the invention, a pair of strap members are employed in lieu of the U-shaped strap member. Each of the strap members in the modified form of the invention have means thereon for engagement with the inner portion of the outlet box.

15 Claims, 12 Drawing Figures

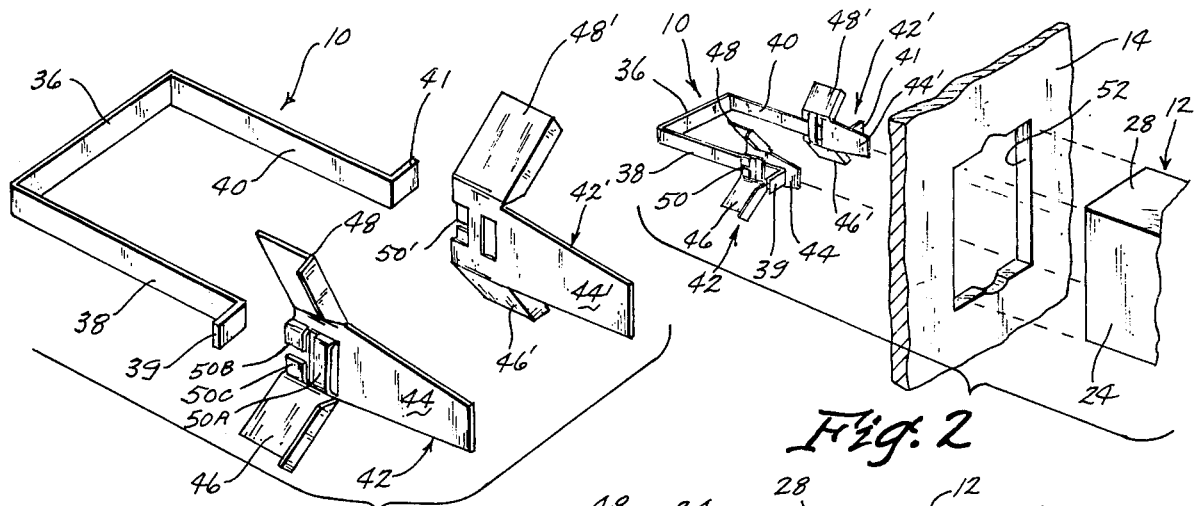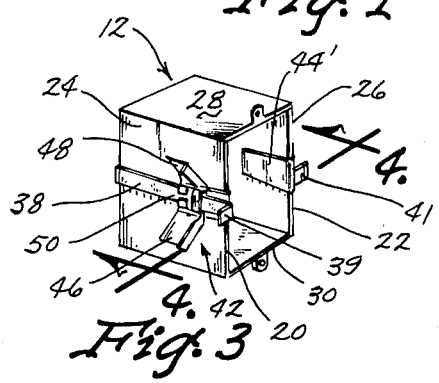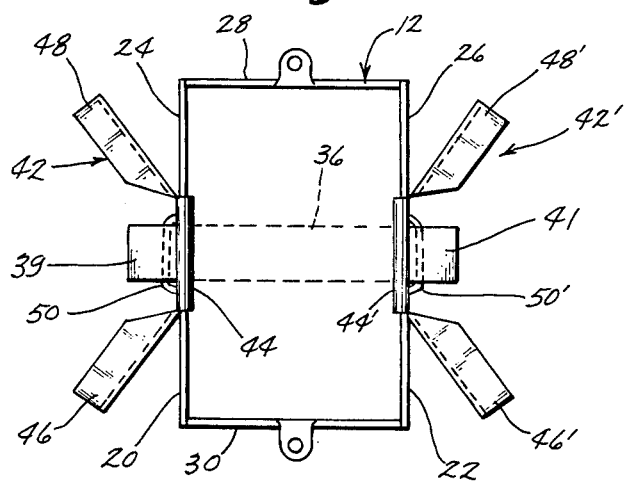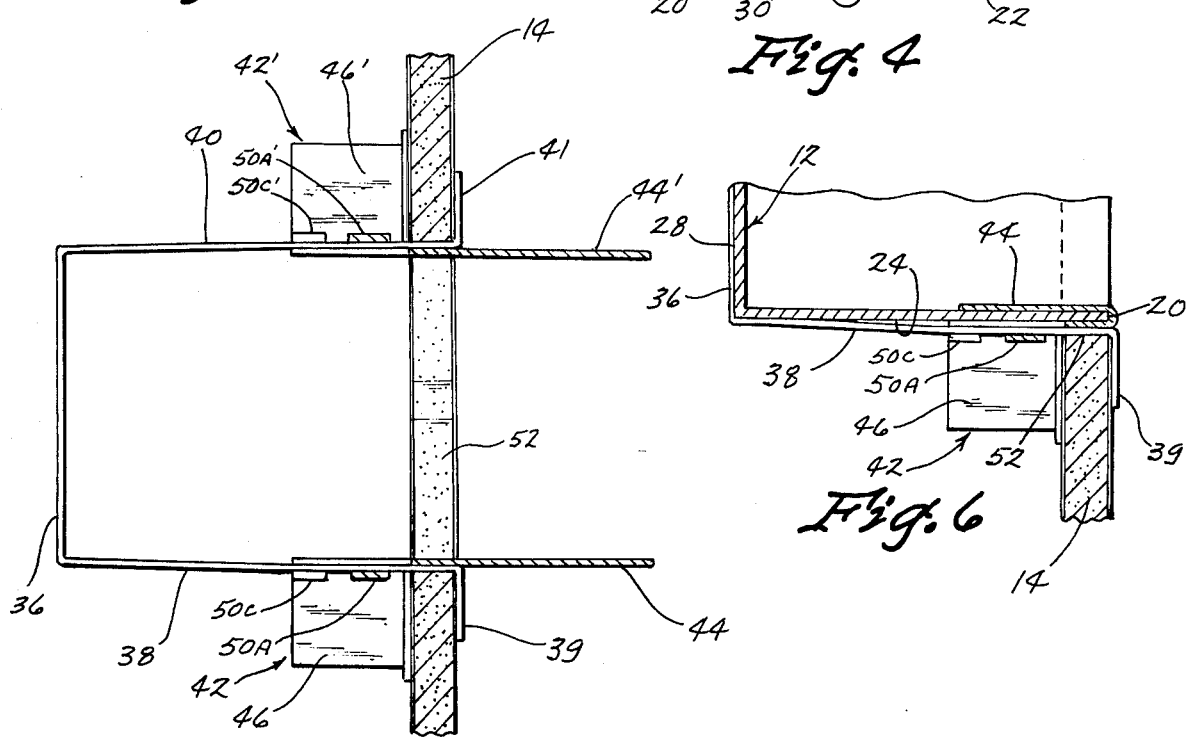

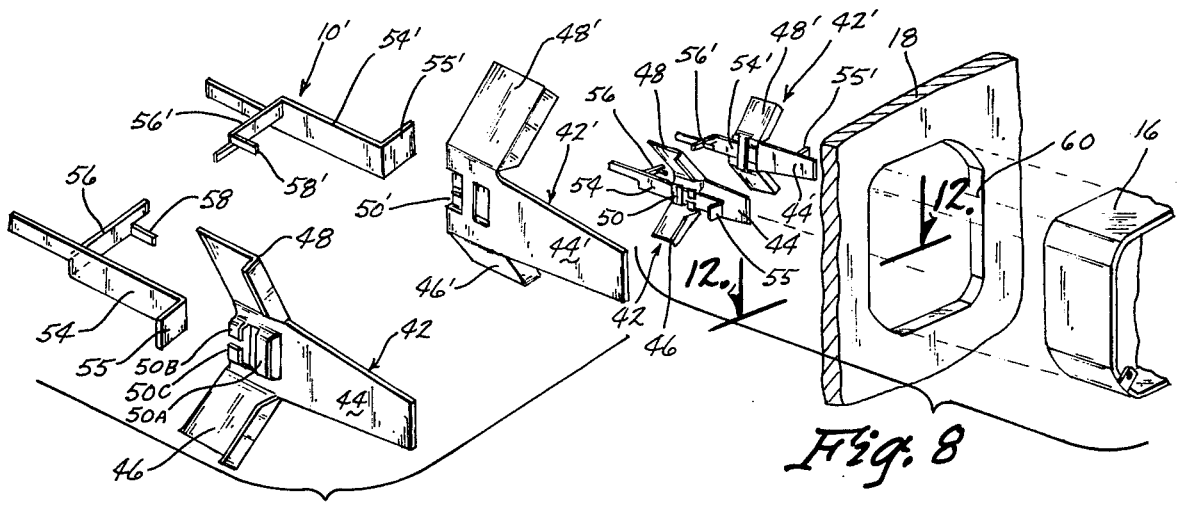
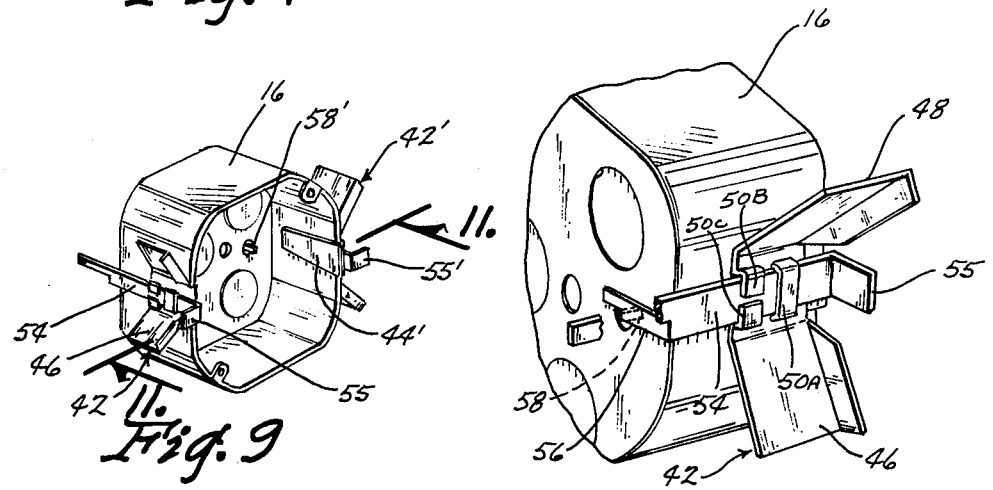
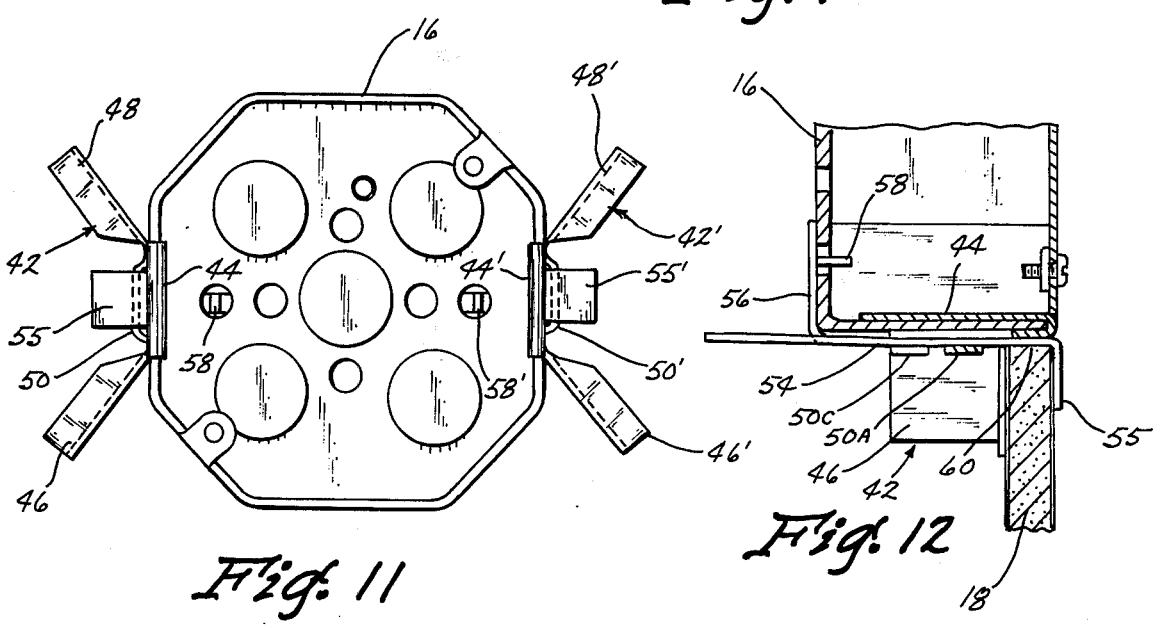

OUTLET BOXHOLDER

BACKGROUND OF THE INVENTION

This invention relates to a means for mounting an electrical outlet box in a ceiling or a wall and more particularly to a means for mounting an electrical outlet box in pre-existing walls or ceilings. During normal home construction, electrical outlet boxes are secured to wall studs or the like prior to the sheet rock or wall board being positioned thereover.

If an electrical outlet box is installed in an existing wall or ceiling, it is extremely difficult to provide a suitable rigid mounting for the box since it is impossible to secure the box to the existing wall studs or ceiling joists. The mounting of the electrical box in existing ceilings and walls is further complicated when paneling or the like is applied over the same due to the increased thickness thereof.

Therefore, it is a principal object of the invention to provide an improved means for mounting an electrical outlet or fixture box in a wall or ceiling.

A further object of the invention is to provide a means for mounting an electrical outlet box which has means thereon for compensating for various wall thicknesses.

A further object of the invention is to provide a means for mounting an electrical outlet box which is economical.

A further object of the invention is to provide a means for mounting an electrical outlet box which may be rapidly installed.

A further object of the invention is to provide a means for mounting an electrical outlet box which does not require its attachment to studs, etc.

A further object of the invention is to provide an electrical outlet boxholder which eliminates the need for a precisely formed opening in the supporting member.

These and other objects will be apparent to those skilled in the art.

BRIEF DESCRIPTION OF THE DRAWINGS

This invention consists in the construction, arrangements, and combination or the various parts of the device, whereby the objects contemplated are attained as hereinafter more fully set forth, specifically pointed out in the claims, and illustrated in the accompanying drawings, in which:

FIG. 1 is an exploded perspective view of the outlet boxholder of this invention;

FIG. 2 is an exploded perspective view illustrating the manner in which the invention of FIG. 1 is mounted in a wall member;

FIG. 3 is an exploded perspective view illustrating the boxholder being mounted on an electrical box;

FIG. 4 is a view seen on lines 4—4 of FIG. 3;

FIG. 5 is a sectional view illustrating the box holder installed in the wall prior to the outlet box being mounted therein;

FIG. 6 is a sectional view similar to FIG. 5 except that the outlet box has been positioned in the boxholder;

FIG. 7 is an exploded perspective view of the invention;

FIG. 8 is an exploded perspective view of the modified form of the invention of FIG. 7 illustrating the relationship of the apparatus to the ceiling member and an outlet box;

FIG. 9 is the perspective view illustrating the modified form of the invention mounted on an outlet box;

FIG. 10 is a partial rear perspective view of the modified form of the invention mounted on the outlet box;

FIG. 11 is a front view of the box as seen on lines 11—11 of FIG. 9; and

FIG. 12 is a partial sectional view illustrating the box mounted in the boxholder and ceiling member.

DESCRIPTION OF THE PREFERRED EMBODIMENT

In FIGS. 1–6, the numeral 10 refers to a boxholder designed to mount an electrical outlet box 12 in a wall member 14. In FIGS. 7–12, the numeral 10' refers to the boxholder which is adapted to mount a light fixture 16 in a ceiling 18.

With respect to FIGS. 1–6, box 12 will be described as having opposite outer edges 20 and 22, opposite sides 24 and 26, top 28, bottom 30 and inner end or back portion 32.

Boxholder 10 commprises a substantially U-shaped strap member 34 comprising a base portion 36 and depending legs 38 and 40. Legs 38 and 40 terminate in laterally extending portions 39 and 41.

Retainers 42 and 42' are selectively slidably mounted on the legs 38 and 40 respectively and generally comprise a base portion 44 having a pair of diverging wings 46 and 48 extending therefrom as best seen in FIG. 1. Base portion 44 is provided with a split channel 50 which is adapted to receive the leg 38 extending therethrough. The forward portion of base 44 is deformable for a purpose to be described hereinafter. More specifically, split channel 50 comprises an arcuate channel member 50A positioned in a spaced relationship to channel portions 50B and 50C.

Retainer 42' includes a base portion 44' having a pair of diverging wings 46' and 48' extending therefrom as shown in FIG. 1. Base portion 44' is provided with a split channel 50' which is adapted to receive the outer portion of leg 40 as illustrated in FIG. 2. The outer end of base portion 44 is also deformable. Split channel 50' comprises an arcuate channel member 50A' positioned in a spaced relationship to channel portions 50B' and 50C'.

Assuming that wall 14 has an opening 52 formed therein, the normal method of mounting the box 12 is as follows. The channel portions 50B, 50C and 50B', 50C' on the retainers 42 and 42', respectively, are bent open so that the legs 38 and 40 may be inserted therein respectively and through channel members 50A and 50A'. The channel portions 50B, 50C and 50B', 50C' are then bent inwardly to the position illustrated in FIG. 2 so that the channels frictionally engage the legs. The legs 38 and 40 are then deflected inwardly towards each other so that the entire assembly may be inserted inwardly through the opening 52. As previously stated, channels 50 and 50' are bent into engagement with the legs 38 and 40 so as to achieve the necessary frictional engagement between the legs of the strap member and the retainers.

As previously stated, the assembly 10 is inserted through the opening 52 so that the retainers 42 and 42' are positioned adjacent the inner surface of the wall member and so that the laterally extending portions 39 and 41 engage the outer surface of the wall member 14. The box 12 is then inserted through the opening between the retainers and between the legs until the back portion 32 engages the base portion 36 which positions the outer end of the box in the proper plane relative to the wall member 14. The outer ends of base portions 44 and 44' of the retainers are then bent inwardly around the outer side edges 20 and 22 of the box 12 as illustrated in FIG. 6. With portions 39 and 41 in engagement with wall member 14 and with the outer ends of the base portions 44 and 44' deformed as described, the box 12 is positively maintained in position in the desired relationship with respect to wall 14 regardless of the thickness of the wall and without the need of attaching the box to an existing stud or the like. Additionally, the boxholder 10 of this invention eliminates the need for precisely drilling the opening 52 since it is not necessary to secure the box to the wall member itself through the use of screws as is sometimes necessary in conventional installations. The cooperation of the base portion 36, portions 39 and 41 and the wings of the retainers as well as the deformable forward portions of the base portions thereof insures that the box is rigidly secured and permits the box to be installed in a matter of seconds thereby greatly decreasing the time and money spent in installing the box.

The boxholder 10' is essentially identical to the boxholder 10 except that a pair of strap members 54 and 54' are employed in lieu of the U-shaped strap member 34 in the embodiment of FIG. 1. Strap members 54 and 54' include inwardly extending portions 56 and 56' with outwardly extending tips or prongs 58 and 58' respectively. Strap members 54 and 54' include laterally extending portions 55 and 55' which are adapted to engage the outer surface of the ceiling. The retainers 42 and 42' are identical to that disclosed in the embodiment of FIG. 1.

Assuming that the opening 60 has been previously formed in the ceiling 18, the retainers 42 and 42' are mounted on the strap members 54 and 54' as in the embodiment of FIG. 1 and are extended through the opening 60 so that the portions 55 and 55' of strap members 54 and 54' engage the ceiling (FIG. 12) and so that the outer ends of the retainers 42 and 42' extend partially outwardly through the opening. The box 16 is then inserted upwardly through the opening 60 while grasping the boxholder 10' to maintain it in position. The box 16 is thereby positioned in the desired relationship relative to ceiling 18 since the prongs 58 and 58' of strap members 54 and 54' extend into openings in the upper portion of the box as illustrated in FIGS. 10, 11 and 12. The retainers 42 and 42' are also moved downardly until the wings thereof engage the ceiling 18 as illustrated in the drawings. The lower or outer ends of the retainers 42 and 42' are then bent inwardly around the edges of the box 16 as illustrated in FIG. 12 which limits the downward or outer movement of the box 16 relative to the ceiling 18.

In each of the embodiments, a means is provided for quickly and easily mounting an electrical outlet box or light fixture box in a wall or ceiling respectively regardless of the location of pre-existing studs, ceiling joists, etc. The boxes may be easily installed in the openings and are rigidly mounted therein regardless of the wall thickness or ceiling thickness. The embodiments are substantially identical except that a pair of strap members are employed in the embodiment of FIG. 7 as opposed to the single strap member employed in the embodiment of FIG. 1.

Thus it can be seen that an improved outlet boxholder has been provided which accomplishes at least all of its stated objectives.

I claim:
1. A means for mounting an electrical outlet box in an opening formed in a wall member, said wall member having inner and outer wall surfaces, comprising,
a substantially U-shaped strap member having a base portion and a pair of depending legs, said strap member adapted to be inserted into the opening in said wall member so that the free ends of said legs extend outwardly therefrom,
a first retainer means slidably mounted on one of said legs and having a first portion thereon for engagement with the said inner wall surface and having a second portion extending outwardly from said opening,
a second retainer means slidably mounted on the other of said legs and having a first portion thereon for engagement with the said inner wall surface and having a second portion extending outwardly from said opening,
said opening, said U-shaped strap member and first and second retainer means adapted to receive outlet box therein, said second portions of said retainer means being deformable so that the second portions of said retainer means may be folded inwardly around the outer edges of said box,
said strap member having free ends on each of said legs for engagement with the outside surface of said wall member.
2. The apparatus of claim 1 wherein each of said first portions comprise a pair of diverging wings.
3. The apparatus of claim 1 wherein each of said retainer means has a channel means formed therein which slidably receives the respective leg of said strap member.
4. The apparatus of claim 3 wherein said channel means yieldably slidably receives said leg.
5. The apparatus of claim 4 wherein said channel means adjustably yieldably receives said leg.
6. The apparatus of claim 1 wherein each of said legs have laterally extending portions at their free ends.
7. A means for mounting an electrical outlet box in an opening formed in a flat supporting member, said supporting member having inner and outer surfaces, comprising,
a first strap member having inner and outer ends,
a second strap member having inner and outer ends,
said strap members adapted to be inserted into said opening so that the outer ends thereof extend outwardly through said opening,
a first retainer means slidably mounted on said first strap member,
a second retainer means slidably mounted on said second strap member,
each of said retainer means having a first portion thereon for engagement with the inner surface of said supporting member and having a second portion thereon extending outwardly from said opening,
said opening and said strap members and said retainer means adapted to receive the outlet box therein,
said strap members having means on the inner ends thereof for engagement with said outlet box,
said second portions of said retainer means being deformable so that the second portions may each be folded inwardly around the outer edges of said box, said strap members having outer ends thereon for engagement with the outer surface of said supporting member.

8. The apparatus of claim 7 wherein said supporting member is a ceiling.

9. The apparatus of claim 7 wherein the inner ends of said strap members have an L-shaped portion for engagement with the inner end of said box.

10. The apparatus of claim 7 wherein each of said retainer means has a channel means formed therein which slidably receives the strap member therein.

11. The apparatus of claim 10 wherein said channel means yieldably slidably receives said strap member.

12. The apparatus of claim 11 wherein said channel means adjustably slidably receives said strap member.

13. The apparatus of claim 7 wherein said strap members each have laterally extending portions at their outer ends.

14. A means for mounting an electrical outlet box in an opening formed in a wall member, said wall member having inner and outer wall surfaces, comprising,
a substantially U-shaped strap member having a base portion and a pair of depending legs, said strap member adapted to be inserted into the opening in said wall member so that the free ends of said legs extend outwardly therefrom,
a first retainer means slidably mounted on one of said legs,
a second retainer means slidably mounted on the other of said legs,
each of said retainer means comprising a base portion having a forward end and a pair of wings extending outwardly from said base portion; said diverging wings being provided for engagement with the said inner wall surface; the forward end of said base portion extending outwardly from said opening,
said opening, said U-shaped strap member and first and second retainer means adapted to receive outlet box therein, said forward portions of said base means of said retainer means being deformable so that the said forward portions may be folded inwardly around the outer edges of said box,
said strap member having free ends on each of said legs for engagement with the outside surface of said wall member,
each of said base means of said retainer means having a channel means formed therein which slidably receives the respective leg of said strap member,
said channel means adjustably and yieldably slidably receiving said leg.

15. A means for mounting an electrical outlet box in an opening formed in a flat supporting member, said supporting member having inner and outer surfaces, comprising,
a first strap member having inner and outer ends,
a second strap member having inner and outer ends,
said strap members adapted to be inserted into said opening so that the outer ends thereof extend outwardly through said opening, each of said strap members having laterally extending portions at their outer ends,
a first retainer means slidably mounted on said first strap member,
a second retainer means slidably mounted on said second strap member,
each of said retainer means comprising a base portion having an outwardly extending portion which extends outwardly from said opening,
each of said retainer means also comprising a pair of wings extending outwardly from said base portion for engagement with the inner surface of said supporting member,
said opening and said strap members and said retainer means adapted to receive the outlet box therein,
said strap members having means on the inner ends thereof for engagement with said outlet box,
said outwardly extending portions of said retainer means being deformable so that they may each be folded inwardly around the outer edges of said box,
said strap members having outer ends thereon for engagement with the outer surface of said supporting member,
each of said base means of said retainer means having a channel means formed therein which adjustably, yieldably and slidably receives said strap member.

* * * * *